United States Patent [19]

Melvin, Jr. et al.

[11] Patent Number: 4,573,170

[45] Date of Patent: Feb. 25, 1986

[54] APPARATUS AND METHOD FOR SAMPLING MULTIPLE CARRIER SIGNALS

[75] Inventors: Waymon A. Melvin, Jr., St. Mathews Township, Wake County; Theodore H. York, Raleigh, both of N.C.

[73] Assignee: Westinghouse Electric Corp., Pittsburgh, Pa.

[21] Appl. No.: 580,504

[22] Filed: Feb. 15, 1984

[51] Int. Cl.⁴ .......................... H04B 7/10; H04L 1/02
[52] U.S. Cl. ..................................... 375/100; 329/104
[58] Field of Search ........................ 375/100, 96, 102; 455/296, 303; 329/104; 340/310 A; 370/106

[56] References Cited

U.S. PATENT DOCUMENTS

| | | | |
|---|---|---|---|
| 3,271,742 | 9/1966 | Rumble et al. | 375/102 |
| 3,571,712 | 3/1971 | Hellwarth | 375/96 |
| 3,938,052 | 2/1976 | Glasson et al. | 375/96 |
| 4,298,984 | 11/1981 | Baker | 375/100 |
| 4,311,964 | 1/1982 | Boykin | 329/104 |
| 4,382,248 | 5/1983 | Pai | 340/310 |

Primary Examiner—Robert L. Griffin
Assistant Examiner—Stephen Chin
Attorney, Agent, or Firm—William D. Lanyi

[57] ABSTRACT

A time diversity carrier signal sampler utilizes a shift register in conjunction with a timer and a plurality of phase samplers. The instantaneous logic level of each phase is measured on a time diversity basis in order to avoid the disadvantageous affects of noise pulses which can occur coincidently on all three phases. The resulting carrier signal data is then provided to a microprocessor for subsequent analysis and phase characteristic determinations. By judiciously selecting the sample and clock frequencies of the shift register, the sampling frequency for each phase and the time between sampling each of the phases can be preselected.

9 Claims, 10 Drawing Figures

| | 1 2 3 4 5 6 7 | 15 16 17 18 | 31 32 33 34 | 47 48 49 50 | 128 |
|---|---|---|---|---|---|
| $T_0$ | 0 0 0 0 0 0 0 | 0 0 0 0 | 0 0 0 0 | 0 0 0 0 | 0 |
| $T_1$ | 1 0 0 0 0 0 0 | 0 0 0 0 | 0 0 0 0 | 0 0 0 0 | 0 |
| $T_2$ | 0 1 0 0 0 0 0 | 0 0 0 0 | 0 0 0 0 | 0 0 0 0 | 0 |
| $T_3$ | 0 0 1 0 0 0 0 | 0 0 0 0 | 0 0 0 0 | 0 0 0 0 | 0 |
| $T_{15}$ | 0 0 0 0 0 0 0 | 1 0 0 0 | 0 0 0 0 | 0 0 0 0 | 0 |
| $T_{16}$ | 0 0 0 0 0 0 0 | 0 1 0 0 | 0 0 0 0 | 0 0 0 0 | 0 |
| $T_{31}$ | 0 0 0 0 0 0 0 | 0 0 0 0 | 1 0 0 0 | 0 0 0 0 | 0 |
| $T_{32}$ | 0 0 0 0 0 0 0 | 0 0 0 0 | 0 1 0 0 | 0 0 0 0 | 0 |
| $T_{41}$ | 1 0 0 0 0 0 0 | 0 0 0 0 | 0 0 0 0 | 0 0 0 0 | 0 |
| $T_{47}$ | 0 0 0 0 1 0 | 0 0 0 0 | 0 0 0 0 | 1 0 0 0 | 0 |
| $T_{48}$ | 0 0 0 0 0 1 | 0 0 0 0 | 0 0 0 0 | 0 1 0 0 | 0 |

APPARATUS AND METHOD FOR SAMPLING MULTIPLE CARRIER SIGNALS

BACKGROUND AND SUMMARY OF THE INVENTION

The present invention relates generally to apparatus for the reception of carrier signals and, more specifically, to apparatus for sampling a plurality of carrier signals at diverse times in order to overcome the potential ambiguity of valid carrier signals during periods of short duration electrical noise which is common to more than one phase of a polyphase electrical transmission system.

The use of high frequency carrier signals to transmit data along transmission lines is known to those skilled in the art. In systems of this type, a high frequency carrier signal, such as a 12.5 kilohertz carrier signal, is imposed on a 60 hertz electrical current and transmitted along a power line. At a location which is generally remote from the transmitter of the carrier signal, a receiver removes the carrier signal from the 60 hertz current, by passing it through a high pass filter, and then examines the carrier signal in order to extract digital data. Various types of carrier signal demodulators can be used to extract the digital data from the carrier signal. One such demodulator is disclosed in U.S. Pat. No. 4,311,964 which issued to Boykin on Jan. 19, 1982. U.S. Pat. No. 4,311,964 discloses an apparatus and method for coherent phase demodulation of a binary phase shift keyed carrier. By sampling the incoming signal at a known sample frequency, it is possible to mathematically deduce the existence of a carrier signal and to extract its digital message from a background which may include significant electrical noise. Improved demodulators, which are appropriate for examining carrier signals, are disclosed in U.S. Pat. Nos. 4,514,697 and 4,516,079 which were filed on Feb. 9, 1983 by York and issued on Apr. 30, 1985 and May 7, 1985, respectively. U.S. Pat. No. 4,311,964 and U.S. Pat. Nos. 4,514,697 and 4,516,079 are hereby incorporated by reference.

The electrical noise normally found on power lines contains components which are periodic and aperiodic, impulsive and continuous. Periodic noise of both the impulsive and continuous types usually has a period which is some harmonic of the power frequency, such as 60 hertz, and originates from loads on the power line such as SCR'S, rotating equipment, etc. Aperiodic noise is generally impulsive and is the result of random events such as switch closures and electrical lightning. Impulsive noise is normally dominant on power lines. Most power line carrier signals differ from noise in that they are usually continuous waveforms such as those employed by frequency shift keyed or phased shift keyed modulation and they avoid high energy content at harmonics of the power line frequency. The sampling frequencies utilized by the aforementioned demodulation patents are specifically selected to minimize the impact of most impulsive noise by separating the samples by multiple carrier cycles.

In some applications of carrier signal communications, a signal is sent from a transmitter which is operatively connected to a single phase electrical system, such as that of a personal residence, and received by a receiver which is located at a remote location and operatively connected to a three phase power line system. In addition, a carrier signal transmitted on one phase of a polyphase electrical transmission system can be coupled to one or both of the other two phases. The strength of these coupled signals are dependent on many factors, such as the length of transmission line over which the signal is present, the configuration of that power line, the frequency content of the signal along with other power line characteristics. These coupling mechanisms generally act equally on carrier signals and electrical noise. Under these circumstances, the receiver can receive and monitor signals on any one or all three of the phases available to it. For this reason, it is preferable for a receiver to be configured in such a way that it is capable of monitoring signals on all three phases of the electrical transmission line. U.S. Pat. No. 4,382,248 which issued to Pai on May 3, 1983 discloses such a polyphase receiver and is hereby incorporated by reference.

The aforementioned coupling of carrier signals between associated phases of a polyphase power line system can be used advantageously by a receiver. The receiver can be connected in such a way that it can monitor signals on all of the phases and these signals can be combined in any one of a number of known techniques in order to result in a single carrier signal which can be decoded to determine its digital message.

A significant benefit can be achieved by having a receiver monitor all phases of a polyphase power line system. The benefits of this type of polyphase reception system can be best realized by comparing it to an alternate system which only monitors one phase. In the single phase receiver system, the presence of electrical noise on the monitored phase can cause a demodulator to miss a valid carrier signal. Although sophisticated techniques for interpreting carrier signals have been developed and are disclosed in the above-mentioned U.S. Pat. No. 4,311,964 and U.S. Pat. Nos. 4,514,697 and 4,516,079, the possibility remains that electrical noise impulses on the transmission line can exacerbate the demodulation of the carrier signal or extend the length of time required in order for a demodulator to determine that a valid carrier signal is present. By comparison, when the receiver is monitoring carrier signals on all phases of a three phase power line transmission system, the carrier signals received on each of the three phases can be compared and combined in order to enhance the determination of the presence or absence of a signal at any given instance of time. If electrical noise is present on one of the three phases, a combination of that signal with the signals received on the other two phases can be made to diminish the effects of that noise on the demodulation process. Therefore, the concurrent monitoring of all phases by a receiver is advantageous when spurious electrical noise exists which is different in content on each of the three phases.

Even in receiver systems which monitor all phases of a polyphase transmission system, electrical noise can make the demodulation and interpretation of the carrier signal more difficult by appearing as erroneous samples within the carrier signal. This problem occurs, even when the receiver is monitoring all three phases, when similar electrical noise samples appear simultaneously on all phases of a polyphase electrical transmission system. The simultaneous appearance of electrical noise pulses on all three phases can occur in at least two ways. First, if all three phases of a power line are disposed proximate a source of electrical noise, that electrical noise can affect all three phases in a similar manner. A second, more common, cause for electrical noise appearing coincidentally on all phases of a power line is that, when electrical noise exists on one phase of a three phase system, that noise is coupled to the other phases in a manner similar to that which couples carrier signals between the phases of a three phase system. The degree of coupling between phases is dependent on the same multiplicity of factors that applies to signal coupling.

Therefore, even though receivers which monitor all three phases of a three phase power line system offer significant improvement over single phase receivers, there are conditions and situations in which even three phase receivers can be adversely affected by electrical noise which, to the demodulator of the receiver, could mask the demodulation of a valid carrier. This problem occurs in three phase receivers when the electrical noise is coincident to all three phases at any specific sample time. If the electrical noise appears in samples from all three phases at any specific time, the noise is given a much greater weight in the demodulation process than if it appeared on a distributed basis. A significant improvement could be realized if a three phase receiver could reduce the probability of a signal noise impulse, common to multiple phases, from generating erroneous samples on all of those phases.

The present invention makes it possible to sample all phases of a three phase system in a manner which minimizes the probability that multiple erroneous samples will occur due to a single noise impulse existing simultaneously sampling on a time diversity basis increases the probability of at least one phase of a three phase receiver having a signal-to-noise ratio much greater than the remaining two phases. This is accomplished by providing a preselected time delay between the sampling of the phases. While providing time diversity between samples on the different phases, the present invention maintains a consistency of timing between sequential samples taken on any specific phase.

In order to provide a time delay between the sampling of each of the three phases, while also maintaining a consistent sampling frequency on each of the phases, the present invention utilizes a device, such as a shift register, which is capable of shifting a string of digital data. The use of a shift register enables the present invention to maintain a pattern of bits which is sequentially shifted as a function of time. As the data is shifted through the shift register, preselected outputs of the register are used to activate sampling mechanisms which are cooperatively associated with each of the phases.

A periodic sample pulse is used as a data input to the shift register in order to change the logic level of the data being shifted through the register. A periodic clock pulse is used to cause the actual shifting of the data. Of course, the clock pulse frequency must be higher than the sample pulse frequency. In the present invention, the clock pulse frequency is chosen to be an integer multiple of the sample pulse frequency and each occurrence of a sample pulse is coincident with an occurrence of a clock pulse to provide synchronization between the clock pulse and sample pulse frequencies.

As the sample pulse proceeds through the data string of the shift register, different outputs of the shift register are affected by any given data bit at different times. Therefore, as the sample pulse proceeds to the first preselected output of the shift register, its logic level will be transmitted to the first phase sampling means. Sequentially, as that same sample pulse is shifted through the shift register, it eventually reaches a second output and the logic level of the sample pulse will activate a second phase sampling means in much the same way as it previously affected the first phase sampling means. By determining the frequency of both the sample and clock pulses, the frequency of sampling for each phase can be determined. Furthermore, the choice of outputs of the shift register will determine the time delay between the sampling of the phases.

By sampling the three phases on a time diversity basis, electrical noise pulses which occur simultaneously on the three phases will not appear in all three phase samples. In this way, the data can be demodulated and interrogated without a single short burst of electrical noise appearing as multiple sample errors to the demodulator.

BRIEF DESCRIPTION OF THE DRAWING

The present invention will be more clearly understood by reading the Description of the Preferred Embodiment in conjunction with the drawing, in which.

DESCRIPTION OF THE PREFERRED EMBODIMENT

The present invention relates generally to the sampling of carrier signals on a three phase transmission line and, more particularly, to the sampling of the carrier signals on each phase of a polyphase electrical system in a manner which provides time diversity between the samples in order to avoid the disadvantageous affects of electrical noise appearing on all three phases simultaneously.

In order to properly understand the present invention, it is necessary to first describe the type of carrier signals which it samples and the problems which can occur because of the existence of simultaneous noise on all phases of a three phase power line. A particular type of carrier signal will be described in relation to the operation of the present invention. This particular carrier signal which will be used for discussion will be a coherent phase shift keyed (CPSK) carrier signal which is especially suitable for electrical utility power line carrier communication systems. However, it should be understood that the present invention is not strictly limited to use with this particular type of carrier signal.

The primary function of any power line communication system is to transmit information between a central utility location and a customer location, over the primary and secondary distribution conductors of a power line. Although the particular information can consist of metering data, load status information or various other useful data in automated distribution systems, the basic operation of such a system requires the data to be converted at a transmitter to strings of binary data bits in a predetermined message format. For purposes of this discussion, that information will be referred to as baseband data. The baseband data is the sequential string of "ones" and "zeros" which are arranged according to a particular protocol in order to represent a message.

In a coherent phase shift keyed system, the baseband data is modulated onto a carrier signal by causing the phase of the carrier to assume predetermined phases according to the logic state of the baseband data bits. The modulated carrier signal is then coupled to the power line conductor and propagated to the destination where a receiver is located. The carrier signal is of a much higher frequency than the 60 hertz current of the power line. This carrier frequency is typically between 5 kHz and 15 kHz. A power line communication system which employs coherent phase shift keyed modulation is described in U.S. Pat No. 4,311,964 which is discussed above.

Figure 1:
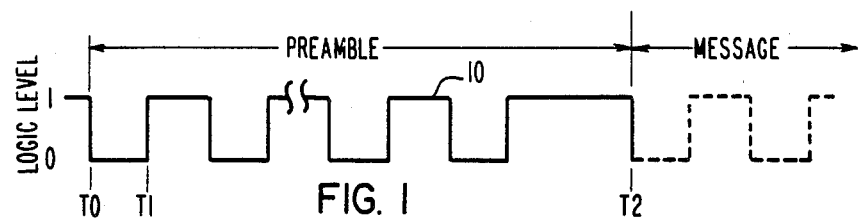
FIG. 1 is an exemplary illustration of baseband data bits which can be transmitted by using a high frequency carrier signal imposed on an electrical transmission line's 60 Hz current.

FIG. 1 illustrates a time based graph of the logic states of the signals of binary baseband data 10 the beginning portion of a carrier data transmission message would typically include a preamble, illustrated in FIG. 1 between times T0 and T2, which comprises a series of sequential "zeros" and "ones", or lows and highs, and ending with two consecutive "ones". In order to permit a receiver to properly identify the beginning of a baseband data message, the preamble consists of a preselected number of alternating "ones" and "zeros" and the two consecutive "ones" at the end of the preamble identify the preamble's end and the message's beginning for the receiver.

It should be understood that each logic level change of the baseband data 10 illustrated in FIG. 1 actually represents many individual pulses of a carrier signal. The reasons for using many carrier pulses to represent a single logic level of a baseband data string will be described below.

Figure 2:
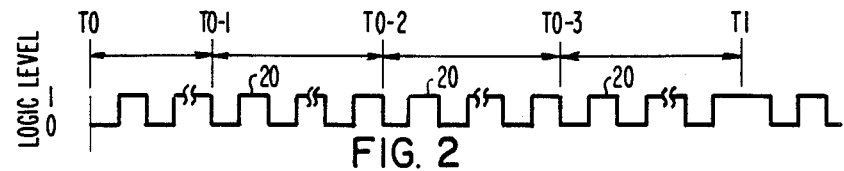
FIG. 2 is an expanded view of the carrier signal which represents the baseband data bits of FIG. 1.

FIG. 2 illustrates an expanded version of the baseband data which is shown in FIG. 1. Comparing FIGS. 1 and 2, it can be seen that the portion of the baseband data which represents the first "zero" or low level segment of the baseband data in FIG. 1, between times T0 and T1, actually comprises a plurality of individual carrier signal pulses.

In FIG. 2, the time period between T0 and T1, is functionally divided into four individual carrier segments. The first carrier segment would extend between times T0 and T0-1, the second carrier segment would extend between times T0-1 and T0-2, and so on. Each carrier segment comprises 41 cycles of a carrier signal. Although the carrier signal in FIG. 2 is broken for purposes of illustration, it should be understood that between times T0 and T1, 164 cycles of a carrier signal are used to formulate the four carrier segments which make up a single data bit of the baseband data 10. Each carrier segment consists of 41 carrier signal cycles 20.

Figure 3:
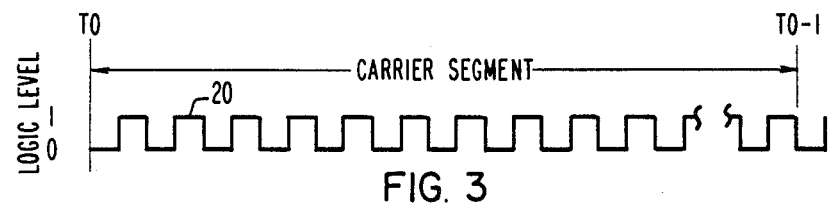
FIG. 3 is a further expansion of the carrier signal of FIG. 2.

FIG. 3 illustrates an expanded view of one carrier segment. This carrier segment, which occurs between time T0 and T0-1, would comprise one fourth of the total number of carrier signal cycles that exist in one baseband data bit. For comparison purposes, one baseband data bit is illustrated in FIGS. 1 and 2 as occurring between times T0 and T1.

Referring again to FIG. 3, 41 carrier signal cycles 20 combined to form the illustrated carrier segment. The carrier segment can be periodically sampled and the logic level of the carrier signal can be stored. The plurality of samples for a given carrier segment can then be algorithmically manipulated to determine the relative position, in time, of its high and low logic levels. This enables a demodulator to determine the phase characteristics of each carrier segment and, therefore, the phase characteristics of the related baseband data bit which comprises four such carrier segments.

It should be understood that, although the signals illustrated in FIGS. 1, 2 and 3 are shown as square waves, the carrier signal originates as a sinusoidal waveform and remains sinusoidal during transmission over the electrical power lines. In the receiver, the sinusoidal waveform is hard limited and this procedure results in a square wave carrier signal.

Figure 4A:
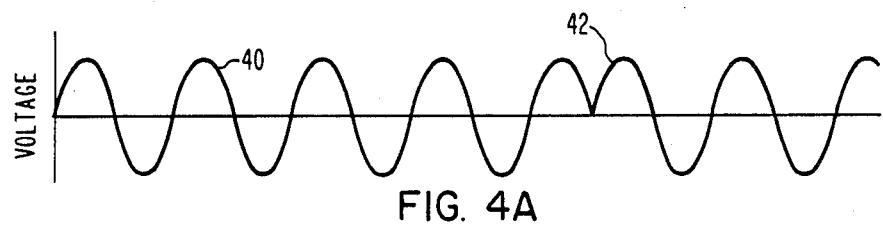
FIG. 4A illustrates a sinusoidal carrier wavve with a phase shift.
Figure 4B:
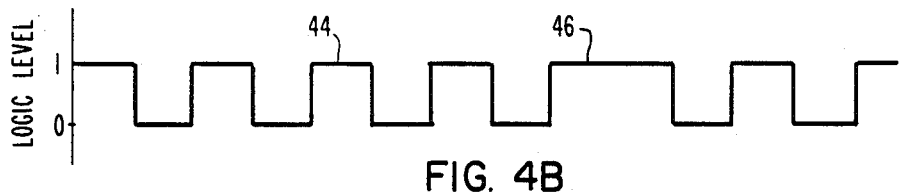
FIG. 4B is a square wave resulting from the hard limiting of the sinusoidal carrier of FIG. 4A.

FIGS. 4A and 4B illustrate the relationship between a sinusoidal carrier signal and its corresponding square wave resulting from the hard limiting procedure. In FIG. 4A, the sinusoidal carrier signal 40 is shown. It should be understood that the sinusoidal carrier 40 would typically be a high frequency signal, of between 5 kHz and 15 kHz, which is imposed on a lower frequency current, such as the 50 or 60 hertz frequency in typical power line systems. The waveform illustrated in FIG. 4A represents the carrier signal 40 as it would appear after passing through a high pass filter that would remove the lower frequencies, such as the 60 hertz waveform. In phase shift keyed carrier signals, logic level changes are represented by phase shifts such as the shift which is illustrated by reference numeral 42. The phase shift 42 would represent a change of state from a logic level 0 to a logic level 1, or vice versa.

Following the high pass filter operation discussed above, the sinusoidal waveform 40 would be hard limited. Hard limiting would transform the sinusoidal waveform 40 into a square wave configuration 44 as illustrated in FIG. 4B. The hard limiting of the phase shift 42 of FIG. 4A would result in the square wave portion 46 in FIG. 4B. In this particular example, the phase shift 42 resulted in two sequential logic level "ones" following the hard limiting operation. It should also be understood that had the phase shift of the sinusoidal wave occur 180° later than illustrated in FIG. 4A, the resulting square wave carrier signal would have two sequential logic level "zeros". Throughout this discussion, a convention will be used in which a high logic level signal will represent a binary digit one and a low level signal will represent a binary digit zero. Therefore, the data string represented by the square wave of FIG. 4B would be "10101010110101 . . . ". FIGS. 4A and 4B therefore illustrate the means by which a coherent phase shift keyed demodulation technique can transmit binary data from a transmitter to a remote receiver.

By comparing FIGS. 4A and 4B, it can be seen that if an electrical noise impulse occurs on the sinusoidal waveform 40, the hard limiting operation would, to some degree, convert that electrical noise signal into a portion of the square wave 44. Since this square wave pulse, which is caused solely by the presence of electrical noise on the sinusoidal waveform 40, will exist within the chain of valid pulses of the square wave carrier signal, it could be incorrectly interpreted as a valid pulse.

As discussed above, sampling of all phases of the polyphase power line system can be helpful in determining whether or not a specific signal is valid or has been caused by electrical noise. The valid signal, as noted above, is highly cyclic with a period specifically selected to differ from any expected noise frequency. Receiver signal sampling patterns are chosen to accent these differences and to reduce the impact of the occurrence of electrical noise in the samples. The impact of noise on demodulation operation is a direct function of the correlation of noise with the sampling pattern. Each of the received signal samples is independently correlated with an expected carrier waveform and then these correlations are combined by the demodulator with earlier sample correlations for signal determination. When a valid signal is sampled, these sample correlations are additive as would be indicative of a valid signal. Correlations of noise samples tend to be more random and, therefore, cancel each other in a manner which is indicative of the absence of a valid signal. When all three phases are sampled, each of the three samples is still independently correlated. When a valid signal is sampled, that is common to two or more phases, reception is enhanced since the number of additive correlation elements is increased. Noise on multiple phases, where the noise on each phase is independent, still cancels even when all three phases are sampled at the same time because of differences in their correlations. Noise on multiple phases, where the noise is common to more than one phase, is additive where all phases are sampled at the same time, thus increasing the demodulator sensitivity to this type of noise. Since the effects of phase-to-phase coupling are generally identical for signal and noise based on energy and frequency content, significant amounts of coupled noise is found.

Figure 5:
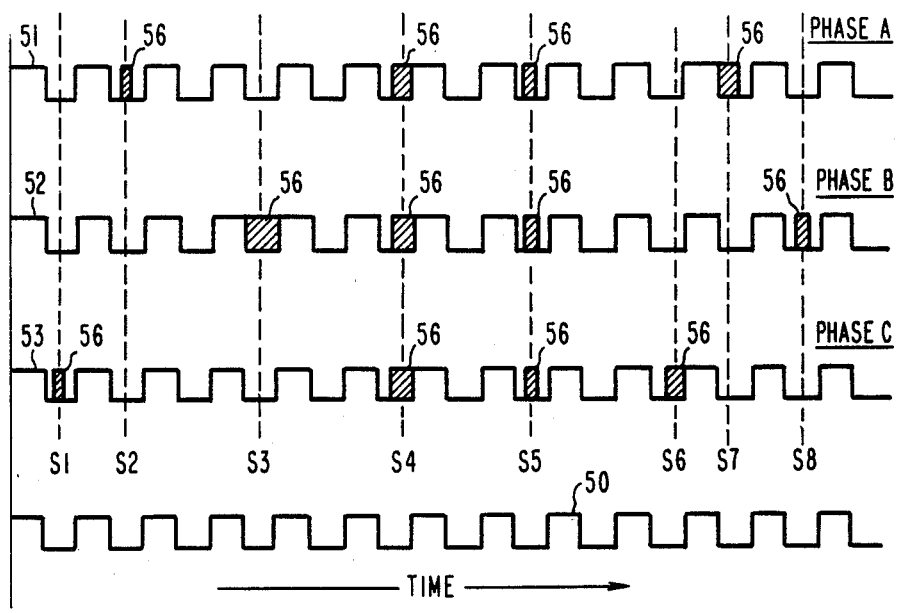
FIG. 5 is a time-based series of carrier signals for three hypothetical phases of a polyphase system along with an ideal, noise-free, representation of the valid carrier signal.

FIG. 5 is a time based illustration of a hypothetical transmitted carrier signal 50 and the representation of that carrier signal as it would appear on the three phases of a transmission power line as the signals are received by a receiver. Carrier signals 51, 52 and 53 would arrive at the receiver's location on phases A, B and C, respectively. It should be understood that, in FIG. 5, the carrier signals are represented as square waves in order to illustrate their appearance following a hard limiting procedure. As discussed above, these carrier signals, 51-53, would travel along the power lines as sinusoidal waveforms prior to their being hard limited at the receiver's location.

In order to more clearly illustrate the effect of electrical noise on carrier signals, various hard limited noise pulses have been included on phases A, B and C in FIG. 5. It should be assumed for the purposes of this discussion, that carrier signal 50 represents the valid noise-free carrier signal as originally transmitted. The hard limited noise pulses 56 are cross hatched for illustration purposes in FIG. 5

If, hypothetically, the three phases in FIG. 5 were all sampled instantaneously at the time S1, the samples of phases A and B would indicate a logical low level or a binary digit "zero". However, the sample of phase C would indicate a logical high level. Using known techniques, the three values taken at time S1 could be compared in such a way so as to deduce that a noise pulse must have caused the logical high level sensed on phase C. Similarly, if all three phases were sampled at time S2, phases B and C would indicate a logical low level while phase a would indicate a logical high level. Again, the results of this sample could be algorithmically determined to be a logical low level, with a noise pulse existing on phase A. The same result would occur with the samples being taken simultaneously on all three phases at times S3, S6, S7 and S8. The effect of the noise induced samples is limited by the fact that they each contribute a random correlation with the expected carrier signal and hence tend to cancel each other. However, if the noise induced signal occurs on all three phases simultaneously, a sampling of all three phases at the same time produces identical correlations which are thus additive and hence have a more detrimental effect on valid signal detection.

If samples of the three phases in FIG. 5 were taken at times S4 or S5, a demodulator would be presented with data which indicates a logical high level at a time when, as can be seen from the noise-free carrier signal 50, the true logical level would be low. Since the hard limited noise signal occurs on each of the three phases, the demodulator will be disproportionately influenced by the additive effects of the noise.

It should be understood that the mere misinterpretation of a single carrier signal sample set would not invalidate present methods of demodulating carrier signals. Many techniques are available to decode carrier signals by taking repetitive samples during the time required for one baseband data bit. Therefore, by taking numerous samples, algorithmic manipulation of the results can adequately describe and decode a carrier signal even when spurious hard limited noise pulses exist within that message. Among the known methods for interpreting carrier signals, U.S. Pat. No. 4,311,964 discusses one in detail. Improvements on that technique can be found in U.S. Pat. Nos. 4,514,697 and 4,516,079 which have been discussed above. These techniques, which are described in the above-mentioned U.S. patents, will therefore not be reiterated herein.

Although present methods enable demodulators to adequately interpret carrier signals even in the presence of electrical noise pulses, the simultaneous sampling of all phases of the three phase system do present potentially disadvantageous conditions. The occurrence of noise sample correlations which have a high probability of being additive reduces the potential performance of the receiver at any given signal-to-noise ratio. For this reason it is advantageous to develop a means for sampling the phases of a three phase power line system in such a way so as to introduce a time diversity between samples of associated phases while maintaining a precise frequency of samples on any particular phase.

Figure 6:
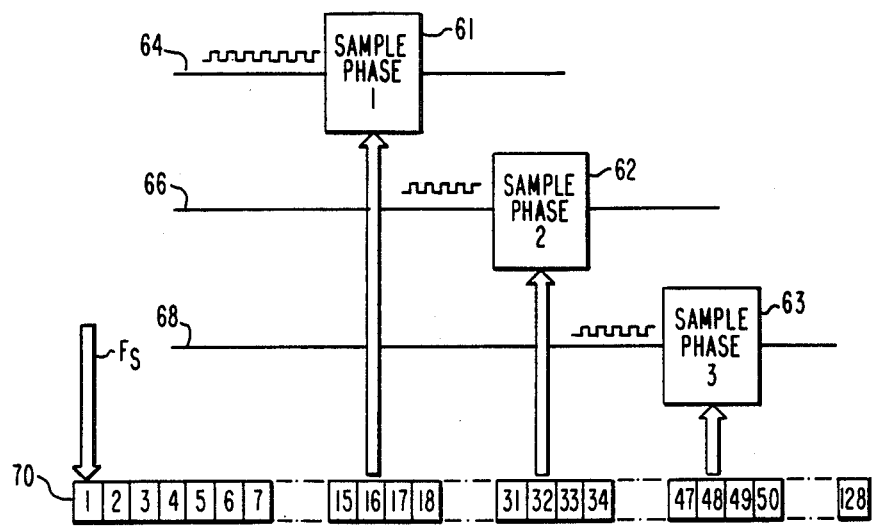
FIG. 6 represents an exemplary data string passing through a shifting means along with three phase samplers which are attached to outputs of the shifting means.

In order to explain the concept of the present invention, the shifting of a string of digital data will be described in conjunction with means for storing the instantaneous voltage level of each of three phases which have carrier signals imposed on them. FIG. 6 illustrates a functional diagram of three phase samplers, 61, 62 and 63. Conductive lines, 64, 66 and 68 are cooperatively associated with the phase samplers. The conductive lines each have a square wave carrier signal passing through them. The three conductive lines, 64, 66 and 68, are associated with the phase samplers, 61, 62 and 63, in such a way that the voltage level of the square wave carrier signal on each of the conductive lines can be instantaneously sampled. For purposes of illustration, a data shifting means 70, which has the capability of storing and shifting 128 binary digits, is illustrating in FIG. 6 with three preselected outputs connected to the three phase samplers, 61, 62 and 63. As shown in FIG. 6, an output from the 16th, 32nd and 48th data string positions are operatively connected to the phase samplers, 61, 62 and 63, respectively. In operation, when a binary digit 1 appears in the 16th bit position of the shifting means 70, a pulse is sensed by phase sampler 61 which is associated with phase 1. Similarly, when a binary digit 1 appears at bit locations 32 and 48 of the shifting means 70, phase samplers 62 and 63 are activated, respectively.

Therefore, in the exemplary diagram of FIG. 6, it can be seen that, if a binary digit 1 was placed in the first location of the shifting means 70, each sequential pulsing of the shifting means 70 by an appropriate clock pulse would cause that binary digit 1 to move to the right into sequential positions of the shifting means 70. As the binary digit 1 passes into the 16th location of the shifting means 70, a signal would be sensed by the phase sampler 61 for the first phase and the instantaneous voltage level of the carrier signal on the conductive line 64 would be recorded and stored. Similarly, as a binary digit 1 passes into the 32nd location of the shifting means 70, an instantaneous voltage level of the carrier signal on conductive line 66 would be stored and, as the binary digit 1 is shifted into location 48 of the shifting means 70, the phase sampler 63 which is operatively associated with the conductive line 68 would store the instantaneous voltage level of its carrier wave.

Therefore, the timed diversity between samples on any two phases can easily be determined if the associated ouput locations of the shifting means 70 for those phases is known and the frequency of the clock pulse is known. The sample diversity between any two phases is the product of the number of stages of the shifting means between sample controls for those phases and the period of the clock pulse train. By way of example, if this product is equal to an integer times the period of the carrier signal, then the samples of valid carrier signals within the same baud interval will have identical values for the different phases in the absence of noise. Note that this condition allows the demodulator to act on the samples as if they occurred at the same time for each phase while assuring the time diversity which decreases the probability of common noise samples from multiple phases.

Furthermore, the frequency at which a new binary digit 1 is inserted into the first location of the shifting means 70 determines the frequency at which any specific phase is sampled. As an example, if a sample pulse $F_S$ is caused to occur every 410 microseconds and a clock pulse is caused to occur every 10 microseconds, each phase will be sampled at the rate of once every 410 microseconds. Furthermore, by knowing that phases 1 and 2 are operatively associated with locations 16 and 32 of the shifting means, respectively, it can be easily determined that phase 2 will be sampled 160 microseconds after phase 1 is sampled. Also, since phase 2 and phase 3 are operatively connected to outputs of the shifting means 70 which are 16 locations apart, phase 3 will be sampled 160 microseconds after phase 2 is sampled. Using these magnitudes as an example, it can then be determined that each of the three phases will be sampled at the rate of once every 410 microseconds and the three phases will be sampled 160 microseconds apart. More specifically, phase two will be sampled 160 microseconds after phase one is sampled and phase three will be sampled 160 microseconds after phase two is sampled. However, it should be noted that phase one will again be sampled 90 microseconds after phase three is sampled.

Illustrated below the shifting means 70 are rows and columns of binary digits which represent the contents of the illustrated locations of the shifting means 70 at various points in time. For purposes of this illustration, the points in time, $T_0$–$T_{48}$, have been numbered coincidentally with associated pulses of a clock which has a 10 microsecond period. At time $T_0$, all locations of the shifting means 70 are shown as having binary digit zeros in them. At time $T_1$, following an occurrence of a clock pulse, a binary digit 1 is placed in the first location of the shifting means 70 by an appropriate means for supplying a sample pulse $F_S$. At time $T_2$, following one occurrence of a clock pulse, the binary digit 1 is shifted into the second location of the shifting means 70. Furthermore, at time $T_3$, which is 20 microseconds after the insertion of the binary digit into the first location of the shifting means 70, the binary digit 1 can be seen in the third location of the shifting means 70. This process would continue as sequential clock pulses cause the binary data to shift through the shifting means 70 and at time $T_{15}$ the binary digit would be located in the 15th location of the shifting means 70.

When the binary digit 1 is shifted into the 16th location of the shifting means 70, at time $T_{16}$, a signal is sent to the phase sampler 61 for phase 1 and the phase sampler 61 records and stores the instantaneous logical level of its associated carrier signal. The clock pulses would continue and, at time $T_{32}$, the binary digit would be shifted into location 32, causing the phase sampler 62, which is operatively associated with phase 2, to record and store the instantaneous logical level of its associated carrier signal. This process would continue and, at time $T_{48}$, the binary digit would be shifted into location 48 of the shifting means 70 and the instantaneous logical level of the carrier signal associated with phase 3 would be sampled and stored. Therefore, it can be seen that, by placing a binary digit 1 in the first location of a shifting means 70 and sequentially shifting that binary digit through the shifting means, the phase samplers associated with the three phases of the transmission system can be sequentially activated at predetermined time diversity intervals.

At time $T_{41}$, which is 410 microseconds after time $T_0$, another binary digit 1 is placed into the first location of the shift register 70 by a means for producing a sample pulse $F_S$. As can be seen at time $T_{47}$, when the first binary digit is being shifted into location 47 of the shifting means 70, the subsequent binary digit is being shifted in to the sixth location of the shifting means 70. Therefore it can be seen that a plurality of binary digit "ones" can be simultaneously shifted through the shifting means 70. The distance between the two binary digit ones in this example would determine the frequency at which each of the three phases are sampled.

The illustration of FIG. 6 and the discussion above have been used to illustrate the concept of the present invention. In doing so, the discussion and illustration assume and ideal situation in which a single binary digit can be placed in the first location of the shifting means 70 and sequentially shifted through it. In reality, each cycle of the sample pulse $F_S$ would more probably cause a multiple number of "ones" to be inserted into the shifting means 70. The reason for this is that the duration of each sample pulse may be longer than the duration of one clock pulse. Therefore, as the sample pulse remains high, multiple clock pulses may cause more than one binary digit one to be entered into the data string passing through the shifting means 70. It should be understood that the pulse at the output of the shifting means 70 would still be only a single phase, but it would be longer in duration than a single clock pulse and would be, in fact, equivalent in duration to an integer number of clock pulses. In most applications, this circumstance presents no problem since the phase samplers, 61–63, can be chosen to be activated by the leading edge of a change of logic level state. Therefore, when the contents of a specific location of the shifting means 70 changes from a 0 state to a 1 state, its associated phase sampler would be activated, but upon the shifting of another immediately subsequent binary digit one into that location, no activation would occur. Therefore, in a real application of the present invention, the shifting means 70 would actually have clusters of ones passing through it and each cluster would be separated by a significant series of "zeros". The leading binary digit one of each cluster would be the operative digit in activating each of the phase samplers.

It should be understood that the conductive lines, 64, 66 and 68, are not the electrical transmission lines discussed above. Instead, they are means of transmitting the square wave carrier signals after the sinusoidal carrier signal is passed through a high pass filter and is hard limited.

Figure 7:
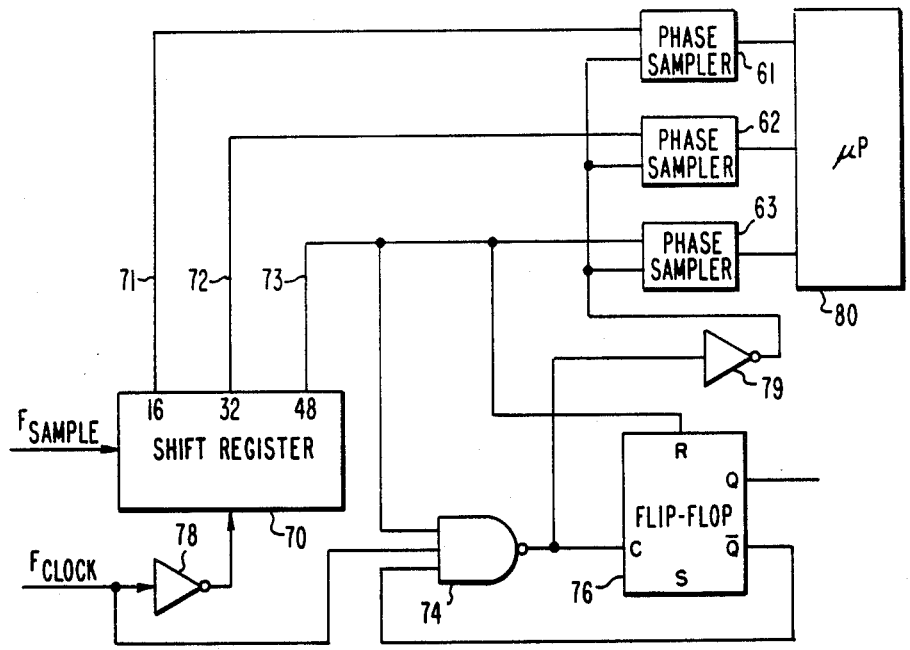
FIG. 7 illustrates a schematic diagram of the present invention connected to three phase samplers and a microprocessor.

FIG. 7 illustrates a schematic diagram of a preferred embodiment of the present invention. A shifting means 70 is provided which has three outputs, 71, 72 and 73, which are each associated with different locations of its data string. In the example shown in FIG. 7, the three outputs, 71, 72 and 73, are associated with locations 16, 32 and 48, respectively, of the shifting means 70. Also illustrated is a source of sample pulses $F_{Sample}$ connected as an input to the shifting means 70. A source of clock pulses $F_{Clock}$ are connected as another input to the shifting means 70. Upon the occurrence of a sample pulse, a binary digit "one" is inserted into the first location of the shifting means 70 and upon each occurrence of a clock pulse, the data string within the shifting means 70 is shifted one location. As the binary digits are shifted through the shifting means 70, they sequentially activate the phase samplers, 61, 62 and 63, because of the association of these phase samplers with the outputs from the shifting means 70. When activated, each of the phase samplers determines and stores the instantaneous magnitude of the voltage level of the carrier signal on its associated phase. In FIG. 7, the phase samplers are not illustrated as being electrically connected to the conductive lines used in FIG. 6. However, it should be understood that each of the phase samplers would be operatively associated with a corresponding carrier signal transmission device.

Also shown in FIG. 7, is a NAND gate 74 and a FLIP-FLOP 76 along with two inverters, 78 and 79. The NAND gate 74 has three inputs and a single output. One of the inputs of the NAND gate 74 is connected to the third of the three outputs from the shifting means 70. A second input of the NAND gate 74 is connected to the source of clock pulses. The output of the NAND gate 74 is connected to a CLOCK input of the FLIP-FLOP 76 and the $\overline{Q}$ output of the FLIP-FLOP 76 is connected as the third input of the NAND gate 74.

As can also be seen in FIG. 7, the output of the NAND gate 74 is also connected to the phase samplers, 61–63 through the inverter 79. The purpose for this connection is to enable the NAND gate 76 to strobe the phase samplers in such a way so as to latch the most recently sampled results of their respective carrier signal voltage levels. This procedure will be described in greater detail below in conjunction with FIG. 8. Inverters 78 and 79 are utilized in FIG. 7 for the purpose of inverting the logic level of their associated signals in order to more appropriately suit the input requirements of the shifting means 70 and the phase samplers, respectively.

Also shown in FIG. 7 is a microprocessor 80 which uses the outputs of the phase samplers as its inputs. The function of the microprocessor 80 is to perform the algorithmic manipulations of the resulting data received from the phase samplers, 61–63. Although the microprocessor 80 is illustrated in FIG. 7, it should be understood that it is not part of the present invention and its operations occur subsequent to the functions of the present invention.

Figure 8:
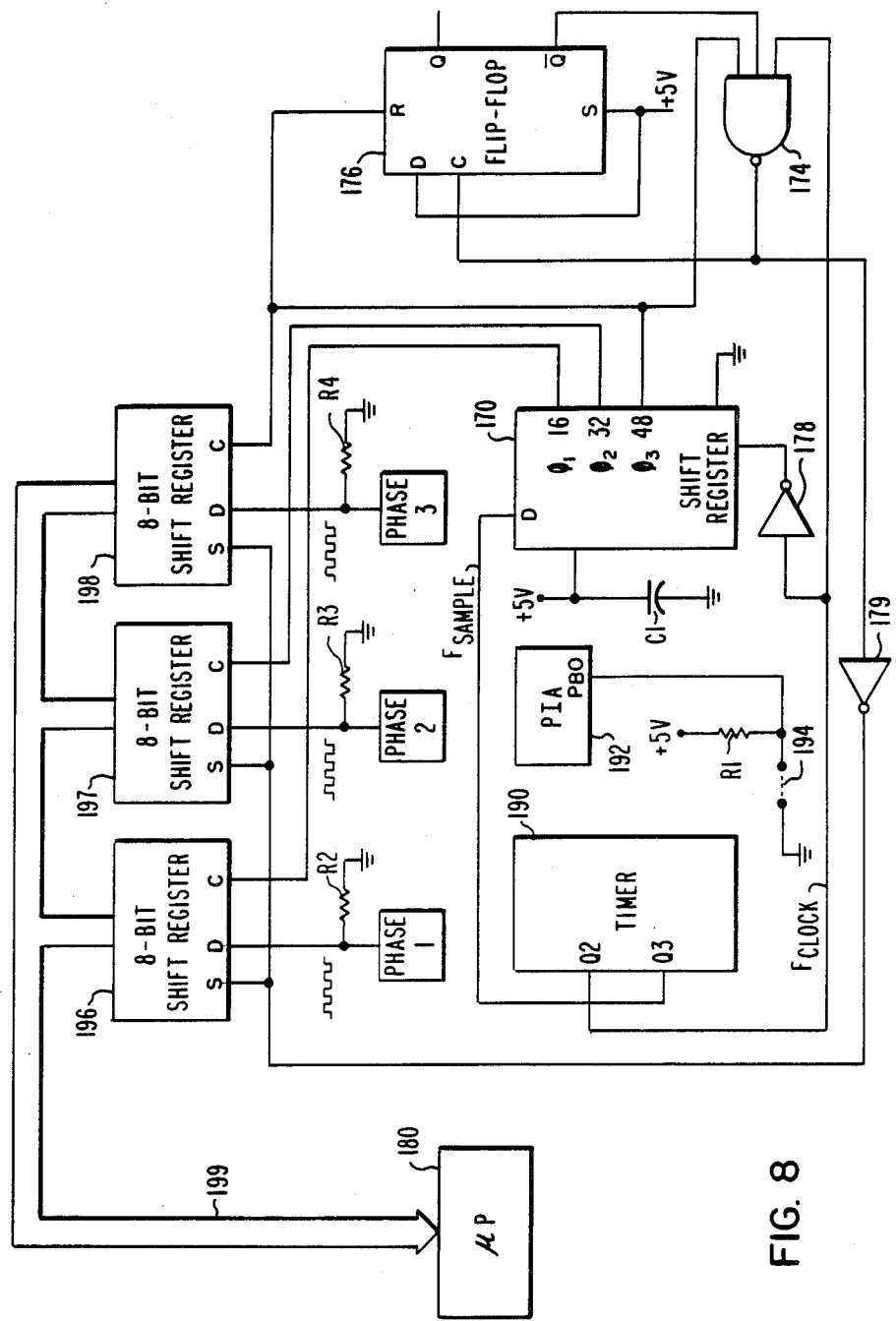
FIG. 8 is a more detailed representation of the diagram of FIG. 7.

A schematic electrical diagram of the present invention is shown in FIG. 8. A shift register 170 is shown having three outputs connected to locations 16, 32 and 48 of its data string. A preferred embodiment of the present invention would utilize a shift register 170 such as type number MC14562B which is a 128-bit static shift register constructed with MOS P-channel and N-channel enhancement mode devices in a single monolithic structure. In this type of shift register, data is clocked in and out of the shift register on the positive edge of the clock input. Data outputs are available every 16 bits, from bit 16 through bit 128. This type of complementary MOS shift register is primarily used where low powered dissipation or high noise immunity is desired. The shift register 170 is analogous in function to the shifting means 70 illustrated in FIGS. 6 and 7 and discussed above. The output from the shift register 170, which is associated with bit 48, is connected to an input of the NAND gate 174.

A preferred embodiment of the present invention would utilize a NAND gate 174 such as type MM74HC11J available from the National Semiconductor Corporation. This type of NAND gate 174 is a low power complementary MOS silicon gate which actually comprises three NAND gates. The NAND gate 174 in FIG. 8 could be configured by using pins 3, 4 and 5 as its inputs and pin 6 as its output.

Another input of the NAND gate 174 is a $\overline{Q}$ output from the FLIP-FLOP 176. In a preferred embodiment of the present invention, the FLIP-FLOP 176 would be type SN54LS74 which is available from the Texas Instrument Corporation. This type of device is a monolithic, dual, D-type, edge-triggered FLIP-FLOP featuring direct clear and preset inputs and complementary Q and $\overline{Q}$ outputs. Input information is transferred to the Q output on the positive edge of the clock pulse. Clock triggering occurs at a voltage level of the clock pulse and is not directly related to the transition time of the positive going pulse. After the clock input threshold voltage has been passed, the data input D is locked out. The reset input of the FLIP-FLOP 176 is connected to the output from the shift register 170 which is associated with bit position 48. A five volt DC source is connected to both the supply voltage and data input ports of the FLIP-FLOP 176. FLIP-FLOP 176 is analogous to FLIP-FLOP 76 which is illustrated in FIG. 7 and discussed above.

As discussed above, the inverters 178 and 179 are utilized to invert the logical signals for purposes of matching the input characteristics of their associated devices. A preferred embodiment of the present invention would utilize a hex inverter type MM74HC04J which is available from the National Semiconductor Corporation. This type of device has inputs which are compatible with standard complementary MOS outputs and consists of six three stage inverters.

A timer 190 is provided as a means for providing the clock pulse $F_{Clock}$ and the sample pulse $F_{Sample}$. A preferred embodiment of the present invention would incorporate a timer such as type MC6840 which is available from the Motorola Corporation. This type of programmable timer module is a programmable subsystem component of the M6800 family designed to provide variable system time intervals. It has three 16 bit binary counters, three corresponding control registers and a status register. The counters may be used to cause system interrupts or generate output signals. This type of timer may also be utilized for such tasks as frequency measurements, event counting or interval measuring. As configured in FIG. 8, the timer 190 has its two inputs, Q2 and Q3, connected to the inverter 178 and the shift register 170, respectively. When a timer as described above is used, the Q2 and Q3 outputs are located at its pins 3 and 6, respectively.

The CSI input of the timer 190 is connected to a positive five volt DC source and a resistor R1. The other terminal of the resistor R1 is connected to the PBO terminal of a peripheral interface adapter (PIA) 192. In a preferred embodiment of the present invention, a peripheral interface adapter 192 such as type MC6821 would be used. This type of PIA is available from the Motorola Corporation and provides the universal means of interfacing peripheral equipment to the M6800 microprocessing unit. This type of device is capable of interfacing he microprocessing unit to peripherals through two eight-bit bi-directional peripheral data buses and four control lines. No external logic is required for interfacing to most peripheral devices. The terminal of resistor R1 which is connected to the peripheral interface adapter 192 is also connected to ground through a removable jumper 194. The removable jumper 194 provides the capability of choosing two alternate frequencies for the clock and sample pulses. These frequencies would be chosen as a function of the particular carrier signal frequency utilized with the present invention. With the removable jumper 194 in place, the timer 190 would output a frequency suitable for use with a carrier signal of 12.5 kilohertz and, with the removable jumper 194 removed, the timer 190 is suitable for use with a carrier signal frequency of 9.615 kilohertz.

The shift register 170 is connected to a 5 volts DC source and to ground through a capacitor C1. The three outputs of the shift register 170 are each connected to an eight bit shift register. These shift registers, 196, 197 and 198 are operatively associated with the outputs of the shift register which are connected to bit locations, 16, 32 and 48, respectively. The shift registers, 196, 197 and 198, along with their associated hardware, are analogous to the phase samplers, 61, 62 and 63 which are illustrated in FIGS. 6 and 7 and discussed above. Shift registers 196, 197 and 198 are identical and, in a preferred embodiment of the present invention, are type CD4094B or type MC14094B which is available from the Motorola Corporation. This type of shift register combines an eight stage shift register with a data latch for each stage and a three state output from each latch. The data is shifted on the positive clock transition and is shifted from the seventh stage to two serial outputs. Data from each stage of the shift register is latched on the negative transition of the strobe input. Data propagates through the latch while the strobe is high. Outputs of the eight data latches are controlled by three buffers which are placed in the high impedance state by a logic low on output enable. As can be seen in FIG. 8, each of the eight bit shift registers, 196, 197 and 198, has its clock input connected to an associated output from the shift register 170. Upon an occurrence of a signal at its clock input, each shift register would store the instantaneous voltage level of its associated carrier signal. The data input for each of the eight bit shift registers is operatively connected to a conductor on which the associated square wave carrier signal is available. Each of these conductors is connected to ground through a resistor. The data inputs for shift registers, 196, 197 and 198 are operatively connected to resistors R2, R3 and R4, respectively.

The output of shift register 170 which is associated with bit 48 is connected as an input to the NAND gate 174. When this signal exists, in conjunction with a clock pulse and a $\overline{Q}$ output from the FLIP-FLOP 176, the output of the NAND gate 174 changes state and, after passing through inverter 179, provides a strobe pulse for each of the eight-bit shift registers. This strobe pulse latches the most recently recorded results of each of the eight bit shift registers, 196, 197 and 198. When eight such results are latched in the eight bit shift registers, the data is transmitted to the microprocessor 180 along the data bus 199. The eight bits of data from each of the eight-bit shift registers is transferred to the microprocessor 180, in parallel, along the data bus 199 and the data can then be subsequently examined and manipulated in order to determine the characteristics of each of the three carrier signals, one from each phase.

It should be understood that the microprocessor 180 performs its function after the present invention completes its operation. Of course, the microprocessor 180 must have the capability to mathematically manipulate its data inputs from the eight bit shift register and perform the necessary algorithms to characterize the phase relationships of the three related carrier signals. Any microprocessor which has the proper I/O and speed capabilities to perform these tasks can be utilized in conjunction with the present invention.

As described above in conjunction with FIG. 8, a preferred embodiment of the present invention utilizes a shift register 170 with three outputs, each of the outputs being associated with a particular bit position of a data string. A sample pulse $F_{Sample}$ is provided as an input for the shift register from a timer 190. The shift register 170 is also provided with a clock input $F_{CLock}$ from the timer 190. It should be understood that the clock pulses have a higher frequency than the sample pulses and the frequencies of these two pulses are related by an integer multiple. Furthermore, the timer 190 must be capable of synchronizing each sample pulse with one of the clock pulses. The FLIP-FLOP 176 and NAND gate 174, in conjunction with the shift register 170, provide a strobe pulse for the three eight-bit shift registers that store the instantaneous values of the carrier signals. The resulting data is stored in each of the eight-bit shift registers until the registers are full and, at that time, the data is transferred to a microprocessor 180 for subsequent analysis. It should be understood that, although three eigh-bit shift registers were used in this preferred embodiment of the present invention, alternative devices could also be used with the present invention. The use of eight-bit shift registers coincided advantageously with the timing requirements of the described system although other sizes of shift registers could also have been used.

Figure 9:
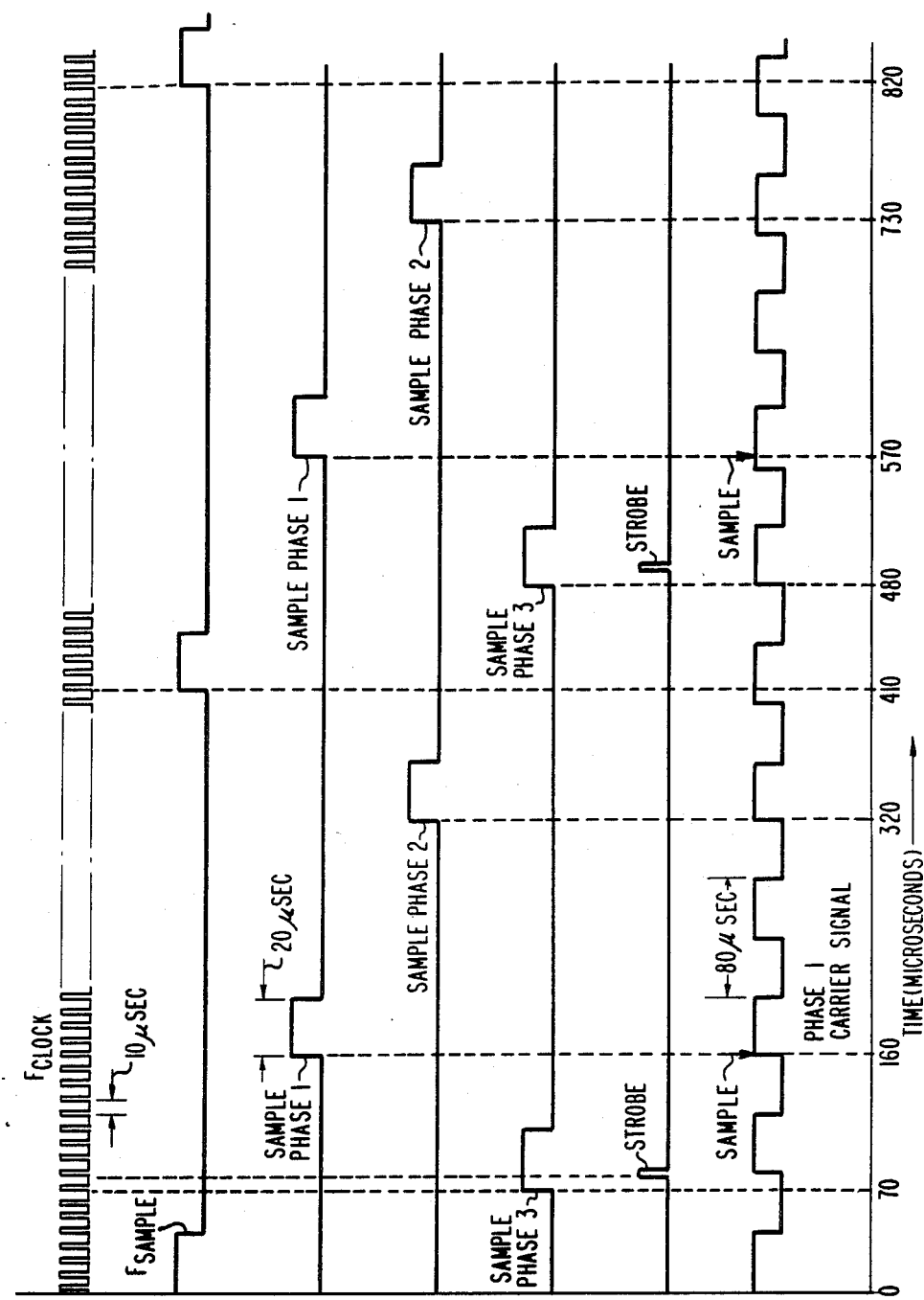
FIG. 9 is a timing chart of the relevant signals used by and produced by the present invention.

In order to more fully explain the operation of the preferred embodiment of the present invention which is illustrated in FIG. 8, the timing chart of FIG. 9 will be used to sequentially describe the process of time diversity sampling which is made possible by the present invention. In FIG. 9, the sequential signals associated with the present invention are plotted along a time line which extends from 0 to 820 microseconds. The clock pulses $F_{Clock}$ continuously occur at a frequency of 100 kilohertz, or one pulse every 10 microseconds. Although the clock pulse line is shown broken in the illustration of FIG. 9, it should be understood that this was done for convenience and that the clock pulses are continuous throughout the operation of the present invention. The sample pulse $F_{Sample}$ occurs every 410 microseconds as shown. Comparing FIGS. 8 and 9, each sample pulse from the Q3 output of timer 190 would change the status of the first bit position of the shift register 170. In FIG. 9, one sample pulse is shown beginning at time zero and extending for approximately 20 microseconds and, after a delay period, another sample pulse begins at time 410 and lasts for approximately 20 microseconds. Sixteen clock pulses after the first sample pulse, or at 160 microseconds, the sample pulse data will have been shifted to the 16th bit position of the data string in the shift register 170. Therefore, as indicated by the line "sample phase one", bit 16 of the shift register 170 will remain at a logical high level until the number of binary digit "ones" deposited by the sample pulse pass through it. The leading edge of the phase one sample pulse, at 160 microseconds, will cause the associated sampling hardware for phase one (reference numeral 61 in FIG. 7 or reference numeral 196 in FIG. 8) to be activated and a sample of the phase one carrier signal will be stored by the eight-bit shift register 196 which is operatively connected to the bit 16 output of the shift register 170. The bottom waveform in FIG. 9 represents the phase one carrier signal square wave. At 160 microseconds, the "sample" arrow indicates the value which would be shifted in the eight-bit shift register 196. 160 microseconds following the sampling of phase one, or at 320 microseconds, phase two would be sampled because of the passage of the originally described sample pulse into bit 32 of the shift register 170. Although no phase two carrier signal is illustrated in FIG. 9, it should be understood that a sample value would be taken and stored in the eight-bit shift register 197 which is associated with bit 32 of the shift register 170 and phase two. Similarly, when the originally deposited binary digit one progresses into bit 48 of the shift register 170, at 480 microseconds, the phase three shift register 198 is activated and the instantaneous logical level of its associated phase three carrier signal is taken and stored in a similar manner to that described above in conjunction with phases one and two.

In FIG. 9, it can be seen that the original sample pulse, which occurred at time 0 on the time scale, propagated sequentially through the shift register 170 and caused phases two and three to be sampled at 160 microsecond intervals, sequentially, following the sampling of phase one. As discussed above, the next sampling of phase one would occur 90 microseconds after the sampling of phase three because of the particular shift register implemented in the preferred embodiment discussed herein. Furthermore, the second occurrence of a sample pulse, at 410 microseconds, can be seen to propagate simlarly through the three outputs of the shift register 170 in order to cause the three phases to again be sampled. By a proper selection of clock and sample frequencies, $F_{Clock}$ and $F_{Sample}$, respectively, the present invention has been configured in such a way so as to sample each phase every 410 microseconds and to sample each of the three phases 160 microseconds apart. The choice of 160 microseconds as the interval between phase sampling is not a precise requirement of the present invention. Rather, it is a convenient time interval which spreads the three phase samplings roughly equally throughout the available time frame. Furthermore, the availability of a shift register 170 with outputs every 16 bits made this timing selection desirable. It should be understood that the choice of 160 microseconds between the samples of phase one and two and the samples of phase two and three result in a subsequent sampling of phase one 90 microseconds following the sampling of phase three. Of course, the times between sampling each of the phases would ideally be set to be exactly equal. However, this precise accuracy of time delay is not a requirement for a time diversity sampling scheme. Furthermore, many shift registers are readily available which provide outputs at every 16th bit position. This expediency, along with the use of a 410 microsecond sampling frequency results in a time period between the sampling of phase three and the subsequent sampling of phase one which is not exactly equal to the time periods between sampling of phase one and two or the sampling of phase two and three. This slight inequality of time delay between sampling the three phases of a three phase system, however, does not adversely affect its operation. If a readily available shift register provided outputs at every bit, it would be advantageous to select bits 14, 27 and 41 as the sample pulse output bits. This selection would result in a time period of 130 microseconds between sampling phases one and two, 140 microseconds between sampling phases two and three and 140 microseconds between sampling phase three and a subsequent sampling of phase one. However, it should be realized that, in order to achieve symmetry between the sampling of the phases, other costs would have to be incurred. For example, more integrated circuit components may be required at an added expense and resulting in a more space consuming circuit. In the preferred embodiment of the present invention, a nonsymmetrical sampling scheme was chosen in order to reduce both the cost of components and the space required for the related circuitry.

FIG. 9 also illustrates the occurrence of a strobe pulse at 70 and 480 microseconds. This strobe pulse is coincident with next clock pulse following the beginning of the sample pulse for phase 3. This is a result of the three inputs of the NAND gate 174 being satisfied to cause an output, through inverter 179, to the eight-bit shift registers. The phase one carrier signal which is shown at the bottom portion of FIG. 9, has a frequency of 12.5 kilohertz and a period of 80 microseconds as shown. With this frequency of carrier signal, the choice of a 10 microsecond period for the clock pulse $F_{Clock}$ and a 410 microsecond period for the sample pulse $F_{Sample}$ results in eight samples being accomplished for every 41 pulses of the carrier signal. This results in a sample being taken every 5⅛ carrier pulses. These frequency magnitudes were chosen in order to coincide with known demodulator alorithms. These frequencies also result in each baseband data bit being sampled 32 times by a demodulator which receives the data provided by the present invention. This frequency, along with the added ability of a demodulator to examine the data without the disadvantageous affect of having spurious noise-induced invalid carrier bits present, significantly aid in the demodulation of carrier signals.

Several important characteristics of the present invention should be noted. The frequency of the clock pulses $F_{Clock}$ and the sample pulses $F_{Sample}$ are an integer multiple of each other with the clock pulse being a higher frequency than the sample pulse. For example, with a period of 410 microseconds, the sample pulse frequency is 41 times slower than the clock pulse frequency. Another important characteristic of the present invention is that each sample pulse occurs simultaneously with a clock pulse. This is an important requirement in order to synchronize the shifting of the data through the shift register with the deposition of the data into the first bit of the shift register.

The preferred embodiment of the present invention has been illustrated in great detail in FIG. 8. Although it should be understood that alternative embodiments are to be considered within the scope of the present invention, the values or type numbers of the components illustrated in FIG. 8 are tabulated in Table I below.

TABLE I

| Reference Numeral | Value or Type |
|---|---|
| 170 | TYPE MC14562B |
| 174 | TYPE MM74HC11J |
| 176 | TYPE SN54LS74 |
| 178 | TYPE MM74HC04J |
| 179 | TYPE MM74HC04J |
| 190 | TYPE MC6840 |
| 192 | TYPE MC6821 |
| 196 | TYPE MC14094B |
| 197 | TYPE MC14094B |
| 198 | TYPE MC14094B |
| C1 | 0.1 μf |
| R1 | 3KΩ, ¼ watt |
| R2 | 100 KΩ |
| R3 | 100 KΩ |
| R4 | 100 KΩ |

We claim:

1. Apparatus for sampling a plurality of carrier signals, comprising:
    first means for providing a sample pulse, said sample pulse having a first frequency;
    second means for providing a clock pulse, said clock pulse having a second frequency;
    first means for causing a first output signal a first predetermined time period after an occurrence of said sample pulse, said first predetermined time period being generally equal to a first integral number of occurrences of said clock pulses;
    second means for causing a second output signal a second predetermined time period after an occurrence of said sample pulse, said second predetermined time period being generally equal to a second integral number of occurrences of said clock pulse;
    first means for measuring the instantaneous logic level of a first carrier signal, said first measuring means being cooperatively associated with said first causing means, said first measuring means being responsive to said first output signal;
    second means for measuring the instantaneous logic level of a second carrier signal, said second measuring means being cooperatively associated with said second causing means, said second measuring means being responsive to said second output signal; and
    said second frequency being higher than said first frequency, said second frequency being an integer multiple of said first frequency, and means for synchronizing each pulse of said first frequency with a pulse of said second frequency.

2. The apparatus of claim 1, wherein:
    said first and second causing means are provided by a shift register, said first and second providing means being connected to inputs of said shift register.

3. The apparatus of claim 1, wherein:
    said first and second measuring means are cooperatively associated with two different phases of a three phase electrical transmission line.

4. A device for sampling a plurality of carrier signals, comprising:
    first means for storing an instantaneous first logic value of a first carrier signal;
    second means for storing an instantaneous second logic value of a second carrier signal;
    means for shifting a string of digital data;
    first means for providing a sample pulse, said first providing means being operatively connected to said shifting means, said sample pulse being an input to said shifting means;
    second means for providing a clock pulse, said second providing means being operatively connected to said shifting means, said clock pulse being an input to said shifting means, said clock pulse causing said shifting means to shift said digital data;
    a first output of said shifting means being operatively connected to said first storing means, said first output causing said first storing means to store said first voltage value;
    a second output of said shifting means being operatively connected to said second storing means, said second output causing said second storing means to store said second voltage value;
    said clock pulse having a higher frequency than said sample pulse, said clock pulse frequency being an integer multiple of said sample pulse frequency, and means for synchronizing each sample pulse with an occurrence of said clock pulse; and
    said first and second outputs of said shifting means being associated with different locations of said string of digital data, said first and second outputs of said shifting means being affected by a particular one occurrence of said sample pulses at diverse and sequential times.

5. The device of claim 4, wherein:
    said first and second storing means are operatively associated with different phases of a three-phase electrical transmission line.

6. A time diversity carrier signal sampling device, comprising:
    a shift register having a first and second output;
    first means for providing a sample pulse, said first providing means being operatively connected to an input of said shift register;

second means for providing a clock pulse, said second providing means being operatively connected as a clock input of said shift register, said clock pulse having a higher frequency than said sample pulse, said clock pulse frequency being related to said sample pulse frequency by an integer multiple, said sample pulse occurring concurrently with an occurrence of said clock pulse;

first means for determining the instantaneous logic level of a first carrier signal, said first determining means being operatively associated with said first shift register output, said first determining means being activated by a signal from said first shift register output;

second means for determining the instantaneous logic level of a second carrier signal, said second determining means being operatively associated with said second shift register output, said second determining means being activated by a signal from said second shift register output; and said first and second shift register outputs being associated with different digital locations of a data string which is shiftable by said shift register in response to said clock pulse.

7. The device of claim 6, further comprising:
a NAND gate having a first, a second and a third input and an output, said first input of said NAND gate being operatively connected to said second providing means for receiving said clock pulse, said second input of said NAND gate being operatively connected to said second output of said shift register, said output of said NAND gate being operatively connected to a CLOCK input of a FLIP-FLOP, said FLIP-FLOP having a $\overline{Q}$ output operatively connected to said third input of said NAND gate, said FLIP-FLOP having a RESET input operatively connected to said second output of said shift register.

8. A method for sampling a plurality of carrier signals, comprising:
providing a shift register with two outputs, said two outputs being operatively associated with different entries of a data string within said shift register;

inputting a clock pulse at a preselected first frequency into said shift register which causes said data string to shift within said shift register;

inputting a sample pulse at a preselected second frequency into said shift register, said sample pulse being entered into said data string, said first frequency being higher than said second frequency, said first and second frequencies being related by an integer multiple, said sample pulse being synchronized with said clock pulse;

operatively connecting a first one of said two outputs to a first means for determining an instantaneous logic level of a first carrier signal; and operatively connecting a second of said two outputs to a second means for determining an instantaneous logic level of a second carrier signal.

9. The method of claim 8, further comprising:
providing a FLIP-FLOP;
operatively connecting a reset input of said FLIP-FLOP to said second of two outputs of said shift register;
providing a NAND gate having three inputs and an output;
operatively connecting a first of said three inputs of said NAND gate to said second output of said shift register;
operatively connecting a second of said three inputs of said NAND gate to receive said clock pulse;
operatively connecting a third of said three inputs of said NAND gate to a $\overline{Q}$ output of said FLIP-FLOP; and
operatively connecting said output of said NAND gate to the clock input of said FLIP-FLOP.

* * * * *